United States Patent [19]

Matsumoto et al.

[11] 4,302,075
[45] Nov. 24, 1981

[54] DEVICE FOR SPLITTING THE LIGHT BEAM INCIDENT

[75] Inventors: Kazuya Matsumoto, Yokohama; Susumu Matsumura, Kawasaki, both of Japan

[73] Assignee: Canon Kabushiki Kaisha, Tokyo, Japan

[21] Appl. No.: 125,581

[22] Filed: Feb. 28, 1980

[30] Foreign Application Priority Data

Mar. 6, 1979 [JP] Japan ................................. 54-25930

[51] Int. Cl.³ ............................................. G02B 27/14
[52] U.S. Cl. .................................................... 350/171
[58] Field of Search .................. 350/96.19, 171, 172, 350/173; 354/56, 60 L

[56] References Cited

U.S. PATENT DOCUMENTS

| | | | |
|---|---|---|---|
| 3,464,337 | 9/1969 | Trankner | 95/42 |
| 4,103,153 | 7/1975 | Matsumoto et al. | 350/96.19 |
| 4,172,646 | 10/1979 | Matsumoto | 354/60 L |
| 4,215,924 | 8/1980 | Matsumoto | 354/56 |

*Primary Examiner*—John K. Corbin
*Assistant Examiner*—B. W. de los Reyes
*Attorney, Agent, or Firm*—Fitzpatrick, Cella, Harper & Scinto

[57] ABSTRACT

This invention relates to a device for splitting a light beam applicable to a light metering apparatus of a single lens reflex camera. Having a diffraction lattice structure built in the condenser lens, this device has both a beam splitting function and a light condensing function. More in detail, this device includes a condenser lens section and a transparent sheet having a diffraction lattice in one portion which are interconnect by having a lower index layer inbetween. One portion of the light that passes through the taking lens of the camera and is incident on said transparent sheet is diffracted by said diffraction lattice, and further the diffracted light is totally reflected at the boundary surface between said lower index layer and transparent sheet, and transmitted to the end surface of the transparent sheet when it is detected.

5 Claims, 11 Drawing Figures

DEVICE FOR SPLITTING THE LIGHT BEAM INCIDENT

BACKGROUND OF THE INVENTION

1. Field of the Invention

This invention relates to a device for splitting a light beam incident on an optical system by means of a diffraction lattice (or grating) structure.

2. Description of the Prior Art

The light metering apparatus in a camera splits a portion of an image forming light beam which has passed through a taking lens by a beam splitting device, and the thus split light is detected by a light detector. For the beam splitting device useful for such light metering apparatus, there has so far been used several devices. Such beam splitting device for use in a camera, etc. should desirably be as thin as possible. A thin beam splitting device employing a diffraction lattice structure is offered by Matsumoto in U.S. Pat. No. 4,103,153 and U.S. Pat. No. 4,172,646. This device splits the light beam incident on the device into a portion which can be used for light metering and the rest used in order to form a image by means of the diffraction lattice structure. On the other hand, a device formed by not using a diffraction lattice structure but using a plural number of small half mirrors obtained by dividing a half mirror to reduce the thickness is offered in U.S. Pat. No. 3,464,337. However, it is possible to reduce the thickness of the device further by using diffraction lattice structure.

FIG. 1 shows the cross sectional view of a single lens reflex camera employing the beam splitting device offered in U.S. Pat. No. 4,172,646.

In FIG. 1, 1 is a taking lens, 2 is a diaphragm, 3 is a quick return mirror, 4 is a film, 5 is a picture frame, 6 is a focusing plate, 7 is a condenser lens, 8 is a penta prism, 9 is an eye piece, 10 is a beam splitting device, and 11 is a light detector.

FIG. 2 shows the enlarged view of the beam splitting device shown in FIG. 1 and its surrounding section. The light splitting device consists of two parallel flat plates of glass 20 and 20' and a diffraction lattice structure 21 sandwiched between these glass plates. In other words the diffraction lattice structure 21 coated on both surfaces with adhesive is stuck to the two parallel flat plates of glass 20 and 20'. These glass plates 20 and 20' have almost the same refractive index as the diffraction lattice structure 21.

In FIG. 2 the light beam 12 coming from the taking lens 1 and incident on the beam splitting device is partially diffracted by the diffraction lattice structure 21 and the diffracted beam 14 reaches the glass end surface after being totally reflected by the boundary surface between the parallel flat plate glass 20 and 20' and air, and then led to the light detector 11. Moreover, the zero degree (zero order) transmitted light 13 is passed through a condenser lens 22, penta prism 8, and eye piece 9 and reaches the eye. Although it is possible to arrange a light metering device using such a beam splitting device as this at any position in a camera as long as the position is in the image forming light path, it is desirable, from the point of view of camera performance, to place it immediately before the condenser lens as shown in FIG. 1. However, effort has been made recently to push and compress the penta prism 8 toward the quick return mirror to reduce the size of the camera. For this purpose, the interval between the condenser lens and the focusing plate is desirably small and it is undesirable to allow the beam splitting device to occupy a wide space. This means that in the case where a beam splitting device offered in U.S. Pat. No. 4,172,646 is arranged between the condenser lens and focusing plate as shown in FIG. 2, and where the thickness of the beam splitting device is $t_1$, the thickness of the condenser lens is $t_2$, and the interval between the beam splitting device and the condenser lens is $t_3$, the thickness of the section where the condenser lens and the beam splitting device are coupled is expressed by $T = t_1 + t_2 + t_3$ and the reduction in the thickness T leads to a more compact camera.

SUMMARY OF THE INVENTION

An object of this invention is to provide a beam splitting device which can be assembled in an optical device compactly and without utilizing much space.

Another object of this invention is to provide a beam splitting device capable of leading the beam split by the beam splitting device to the outside of the incident beam.

A further object of this invention is to provide a beam splitting device which is unified with another optical element having at least an optical function and which has a plural number of optical functions.

Consideration will now be made to the contents of the total thickness T of the section shown in FIG. 2. In the thickness $t_2$ of the condenser lens 22, the end surface thickness $t_a$ is required in machining the lens surface and the thickness $t_b$ of the curved surface section of the lens is determined by the power value in the design of the condenser lens. Moreover, the thickness $t_1$ of the beam splitting device is desirable to meet $t_1 \geq W/2 \tan \theta$, where W is the width of the diffraction lattice structure 21 and $\theta$ is the diffraction angle of the split beam, as described in U.S. Pat. No. 4,103,153, and accordingly $t_1$ must be thicker than $W/2 \tan \theta$. Thickness $t_1$ seems to be made smaller here by taking a large diffraction angle $\theta$. Since, however, the diffraction angle differs with wavelength, if it is attempted to lead all beams of visible wavelength band to the light detector, it is necessary to increase all diffraction angles of beams of lights of different wavelengths to close to 90°. This is practically impossible.

Further, in the case where the light diffraction lattice is formed of light sensitive material, it is necessary, in order to improve the durability of the light sensitive material, to stick the plates of glass onto the light sensitive material in parallel to seal the light sensitive material layer after developing the light sensitive material as shown in FIG. 2. In this case, taking into account the availability of the glass and the handling easiness, the thickness of these two sheets of glass plates must be greater than a certain value and in some cases the total thickness $t_1$ of the beam splitting device may become thicker than is required in performing desirable beam splitting function.

Moreover, the air layer between the condenser lens 22 and the beam splitting device cannot be omitted since the boundary surface between the plate glass 20 and the air layer is to be used as the total reflection surface of the split light.

For this reason, the total thickness T is limited in its lower limit by the above-mentioned conditions in the conventional formation and size reduction is difficult. This invention attains its purpose by providing a diffraction lattice structure for beam splitting in an optical element having at least one optical function.

In the preferred embodiment the total thickness T is reduced by providing a diffraction lattice structure at the lens end surface section of the condenser lens.

DESCRIPTION OF THE PREFERRED EMBODIMENTS

The first embodiment aims at reducing the thickness T of the total system by unifying a beam splitting device having a diffraction lattice structure with a condenser lens, by providing a lower index layer on the boundary surface of these two to totally reflect the primary diffracted light produced by the diffraction lattice structure at the boundary surface between the lower index layer and the beam splitting device and to lead the primary diffracted light to a photodetector, and by letting the flat portion (end surface thickness section) have the function of a beam splitting device. At the same time this embodiment aims at converging the split beam efficiently by reducing the size of the light reflecting surface at the beam splitting device end surface by adjusting the position of the lower index layer.

Figure 3:
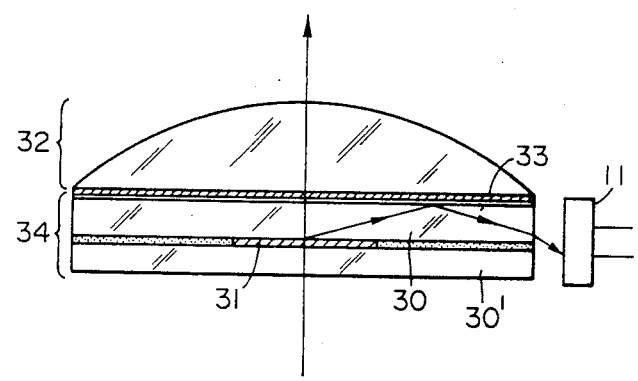
FIG. 3 is the drawing showing the first embodiment of the invented beam splitting device.

FIG. 3 shows a first embodiment. In FIG. 3, 32 is the lens section having the power of a condenser lens, a beam splitting device is formed at the lens end surface thickness section 34.

On the bottom plane of the lens section 32 is stuck closely the parallel plane glass 30 having a refractive index $n_2$ by way of the lower index layer 33 of refractive index $n_3$. The diffraction lattice structure 31 is similarly held between the parallel flat plate glass 30' having a refractive index $n_2$ and the above-mentioned parallel flat plate glass 30.

Assume now, when the mean refractive index of the diffraction lattice structure 31 is $n_1$, that the exit angles of the primary diffracted light generated in the diffraction lattice structure 31 within the diffraction lattice structure 31 and at the parallel flat plate glass 30 be $\theta_M$ and $\theta$ respectively. Then the relationship $n_1 \sin \theta_M = n_2 \sin \theta$ is established. In order for this primary diffracted light to be totally reflected by the lower index layer 33 there must be established the relationships $n_3 \leq n_2 \sin \theta = n_1 \sin \theta_M \leq n_1$. In other words, the refractive index $n_3$ of the lower index layer 33 must be smaller than the mean refractive index $n_1$ of the diffraction lattice. At the time of total reflection at the boundary surface with the lower index layer evanescent waves are produced in the lower index layer. However, by making the thickness of the lower index layer larger than the wavelength order, the evanescent waves will be attenuated within the layer and the loss of the amount of light passing into the condenser lens 32 can be almost ignored. Accordingly, regardless of the upper structure of the lower index layer, the primary diffracted light is not influenced and reaches the end surface and then the light detector 11 after repeating total reflection at both surfaces of parallel flat plate glass.

Figure 1:
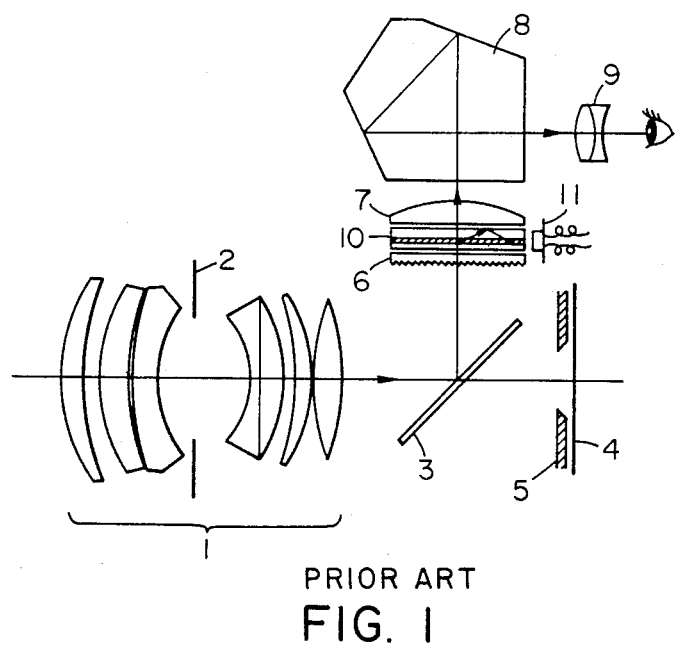
FIGS. 1 and 2 are the drawings showing prior art.
Figure 2:
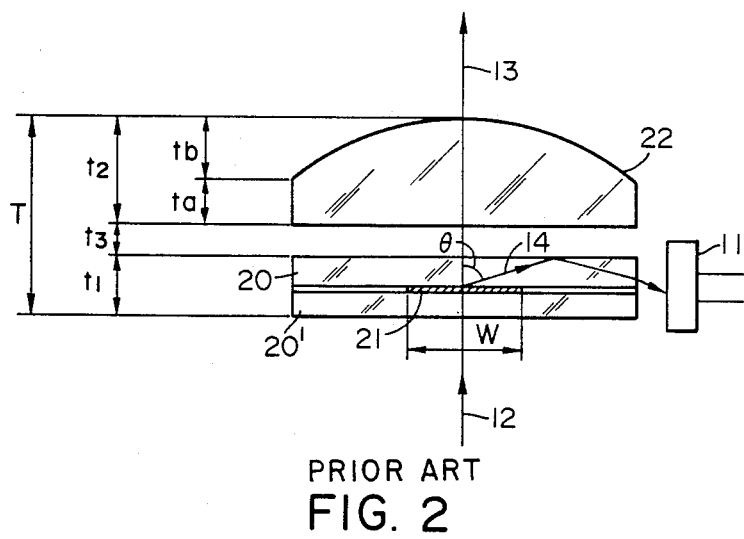
Figure 4:
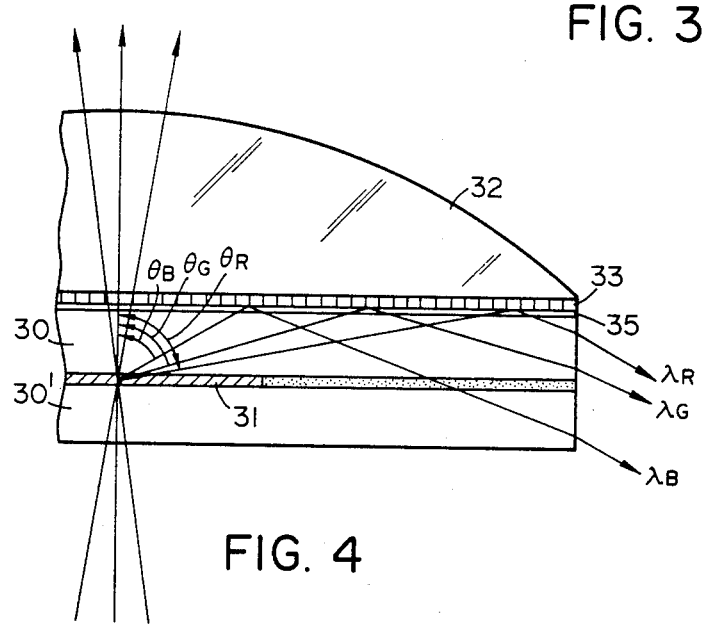
FIG. 4 is the more detailed magnified drawing of the first embodiment.

The critical angle $\theta_C$ between the lower index layer 33 and the parallel flat plate glass 30 is obtained as $\theta_C = \sin^{-1}(n_3/n_2)$. In order to measure the light of visible light range of blue to red, it is necessary to lead these lights of all wavelengths to the exit end surface while totally reflecting them at the boundary surface. As shown in FIG. 4, since the primary diffracted angle $\theta_B$ of the blue light is the smallest diffracted angle among the diffracted angles of blue, green, and red wavelengths, the relationship $\theta_B > \theta_C$ must exist and it is necessary to set the diffraction lattice pitch and lattice line inclination to meet this requirement. However, it is undesirable to allow the diffracted angle $\theta_R$ of the red light, which is the largest diffracted angle, to exceed 90°. Because, if $\theta_R$ exceeds 90°, there exist a light between blue and red and the light proceeds in the diffraction lattice structure to undergo rediffraction and the rediffracted light is emitted toward the 0 degree transmitted light. Therefore, the amount of light reaching the light detector is very small for the lights of the waveband and the color characteristic of light measurement is degraded. Accordingly the diffraction angle $\theta_B$ of the blue light cannot be made larger than a predetermined value due to the above-mentioned condition $\theta_R < 90p$. Therefore, to meet the requirement $\theta_C < \theta_B$ the critical angle $\theta_C$ is desirably small. To meet this requirement the refractive index $n_2$ of the parallel flat plate glass is required to be far greater than the refractive index $n_3$ of the lower index layer. However, if the refractive index of the parallel flat plate glass is too great the primary diffracted light led to the end surface of the parallel flat plate glass is emitted to the air with a large exit angle caused by refraction and in order to detect the light, the light detector must have a larger area and become expensive. This means that the beam splitting device must be designed by taking into account these points and by selecting the material of each element properly. In the first embodiment shown in FIG. 3, the thickness T of the total system is thinner than the conventional example shown in FIG. 2 by $t_a + t_3$ and the total system is that much more compact. The thickness of the lower index layer is about a few $\mu$m which can be ignored.

Moreover, the beam splitting device according to this embodiment is highly efficient in leading the split light to the outside to be incident on the light detector. In the case where a lower index layer is not provided unlike this embodiment, in the beam splitting device one portion of diffracted light, 39, split by the beam splitting device is changed greatly in the direction of reflection at the time it is totally reflected by the lens surface of the condenser lens, the angle of incidence on the beam splitting device end surface is increased. As a result, when the light 39 is emitted into the air from the end surface, loss is caused by end surface reflection and the exit angle to the air becomes great compared with the case of the first embodiment and some of the light will not incident on the light detector, resulting in the decrease in the amount of light incident on the light detector. In the worse cases, the splitted light will be totally reflected by the beam splitting device end surface and will not be emitted into the air.

Therefore countermeasures such as providing a microprism optical element on the end surface or increasing the radius of curvature of the condenser lens should be taken. Since the first embodiment according to this invention has a total reflection plane formed with the lower index layer there is no such inconvenience and further, since by controlling the position of the lower index layer the size of the split beam emitting end surface of the beam splitting device can be set arbitrarily depending on the size of the light detector, the utilization efficiency of the split light is high.

A more detailed configuration in the embodiment shown in FIG. 3 will be described referring to FIG. 4. In this embodiment, the diffraction lattice structure 31 is a volume type phase lattice of mean refractive index $\eta_1 = 1.65$ having lattice constants of pitch $d = 0.2788$ μm and inclination $\alpha = 36.7°$. The lower index layer is a film, 0.5 μm in thickness and $n_3 = 1.38$ is refractive index, if magnesium fluoride ($MgF_2$) vapor deposited on the plane section of the lens section 32. The refractive indices of the adhesive 35 between the lower index layer and the parallel flat plate glass and of the parallel flat plate glass sections 30 and 30' are also 1.65, the same as that of the diffraction lattice structure 31. The volume type phase diffraction lattice used in this embodiment as the diffraction lattice structure diffracts the incident light in accordance with the Bragg's conditions of diffraction $\theta_{in} = \alpha - \sin^{-1}(\lambda/2np)$, $\theta_{out} = \alpha + \sin^{-1}(\lambda/2np)$, (where $\theta_{in}$: angle of incidence, $\theta_{out}$: exit angle).

Figure 5:
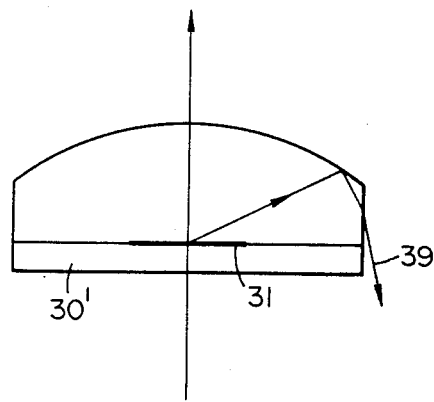
FIG. 5 is the drawing showing the transmission of the diffracted light in the beam splitting device having no lower index layer.
Figure 6:
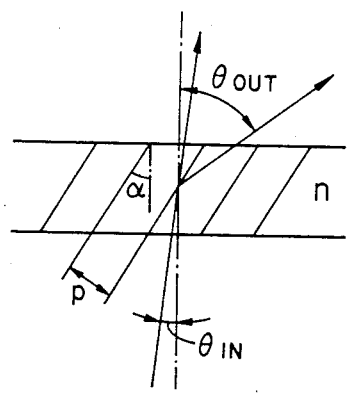
FIG. 6 is the drawing showing a volume type phase diffraction lattice.

Assume now that the wavelengths of blue, green, and red components of the incident light on this diffractive lattice structure be $\lambda_B = 0.45$ μm, $\lambda_G = 0.55$ μm, $\lambda_R = 0.65$ μm respectively and Bragg incident angles of lights of individual wavelengths be $\phi_B$, $\phi_G$, $\phi_R$ and the Bragg primary diffraction light exit angles be $\theta_B$, $\theta_G$ and $\theta_R$. These values are as follows when obtained from Bragg's diffraction conditions described in FIG. 5.

$\phi_B = 7.42°$
$\phi_G = 0.001°$
$\phi_R = -8.25°$
$\theta_B = 65.98°$
$\theta_G = 73.41°$
$\theta_R = 81.65°$ These values are angles in the diffraction lattice structure. In FIG. 4 the critical angle at the boundary surface between the parallel flat plate glass 30' and the air is 37.3° and the critical angle at the boundary surface between the parallel flat plate glass 30 and the lower index layer 33 is 56.76°. These values are smaller than $\theta_B$, $\theta_G$ and $\theta_R$ obtained above. Although the thickness of the lower index layer at this time is of the same order as the wavelength (value in the air), since $\lambda_B$, $\lambda_G$ and $\lambda_R$ are sufficiently larger than the critical angle, almost all light is totally reflected at the boundary surface with this lower index layer. Then the amount of evanescent light leaking to the condenser side becomes negligible. Accordingly the lights of $\lambda = 0.45 \sim 0.65$ μm are repeatedly totally reflected by two boundary surfaces and led to the end surface of the beam splitting device. In this way, it is possible to provide a beam splitting device structure in the thick portion (flat portion) of the condenser lens end surface, to reduce the total thickness T, and accordingly to reduce the area of the split beam emitting end surface. Therefore, a small photo detector is sufficient to meet the purpose. As the material of lower index layer Schott's low index glass etc., can be used by employing modern glass vapor deposition technique. It is also allowed to vapor deposite the lower index layer on the surface of the parallel flat plate glass 30.

Although it is assumed here that the refractive index of the adhesive 35 is equal to the mean refractive index of the diffraction lattice structure 31, they are generally not identical. When the refractive index of the adhesive is lower than the mean refractive index of the diffraction lattice structure, there is a fear of producing total reflection at the boundary surface between the diffraction lattice structure and the adhesive.

Figure 7:
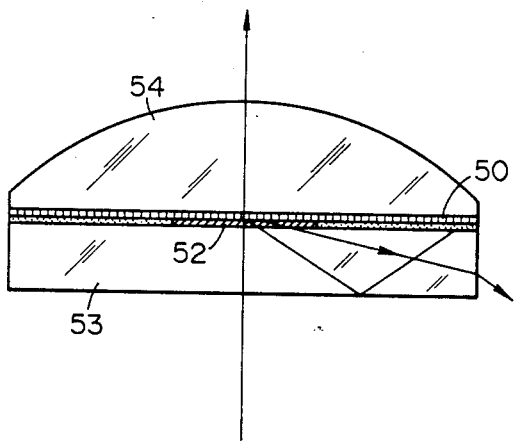
FIG. 7 is the drawing showing the second embodiment of the present beam splitting device.
Figure 8:
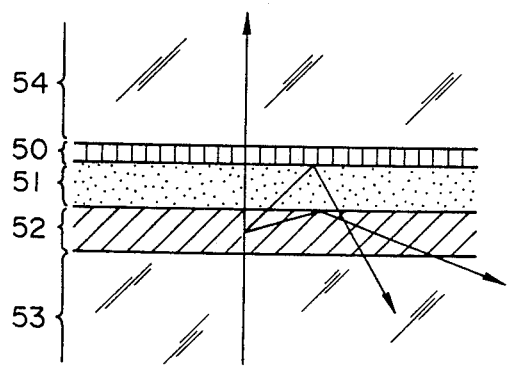
FIG. 8 is the more detailed magnified drawing of the second embodiment.

An embodiment free of such troubles will be described referring to FIG. 7. In FIG. 7, 50 is a lower index layer, 52 is a diffraction lattice structure, 53 is a parallel flat plate glass, and 54 is a lens section. FIG. 8 shows a magnified portion of FIG. 7. An adhesive layer 51 is present between the lower index layer 50 and the diffraction lattice structure 52. In this case, the lower index layer can also be considered as being composed of two layers, the lower index layer 50 and the adhesive layer 51. In other words, when the exit angle of the diffracted light from the diffraction lattice structure is not so large, the diffracted light is totally reflected by the lower index layer 50, and when the exit angle of the primary diffracted light is great, the light is totally reflected by the adhesive layer 51. In this way, a beam splitting device similar to the one shown in FIG. 3 can be made.

Compare the structure of this beam splitting device with that of the embodiment shown in FIG. 3. The number of adhesive layers is reduced by 1 and the number of glass plates is also reduced by 1. As a result, the bonding work is reduced by one time. This means that the present embodiment is a desirable one viewed from the point of mass production.

When the refractive index of the adhesive is larger than the mean refractive index of the diffraction lattice structure the diffracted light emitted from the diffraction lattice structure is not totally reflected by the boundary surface between it and the adhesive but is totally reflected by the lower index layer.

Figure 9:
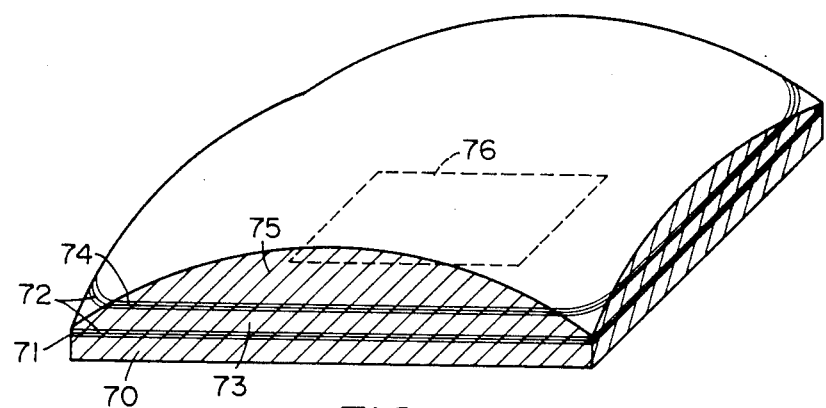
FIG. 9 is the drawing showing the third embodiment of the invented beam splitting device.

An embodiment of beam splitting device having a smaller total thickness T is shown in FIG. 9. In FIG. 9, 70 is a glass element, 71 is a layer containing diffraction lattice structure, 72 is an adhesive layer, 73 is a glass element, 74 is a lower index layer, and 75 is a condenser lens section. 76 shows a diffraction lattice structure which is contained in the same layer as 71. In this case also, like the first embodiment shown in FIG. 3, the refractive indices of glass elements 70, 73 and 75 and of adhesive 72 are assumed to be the same as the mean refractive index of the diffraction lattice structure 76. In other words, this embodiment differs slightly from the first embodiment in that only the shape is different at the lens circumference section, and has the same beam splitting function as the beam splitting device of the first embodiment.

Figure 10:
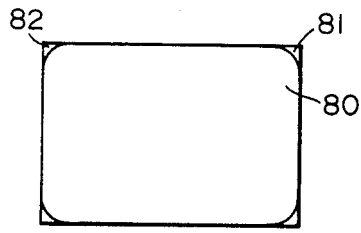
FIG. 10 is the drawing of the beam splitting device of the third embodiment viewed from the finder.

When this condenser lens is viewed from the finder, the joint line of the condenser lens is seen at the surrounding section of the field as shown in FIG. 10. In this case, if the refractive indices of the glass elements 73 and 75 of FIG. 9 are different the powers of the lenses 80 and 81 shown in FIG. 10 become different.

This is inconvenient as the components of a condenser lens. For this reason the glass elements 73 and 75 are desirably of the same material. Moreover, when the adhesive 72 and lower index layer 74 are too thick, the line 82 at the surrounding section of the field shown in FIG. 10 becomes remarkable and causes inconvenience. Therefore, both 72 and 74 are desirably thinner.

Figure 11:
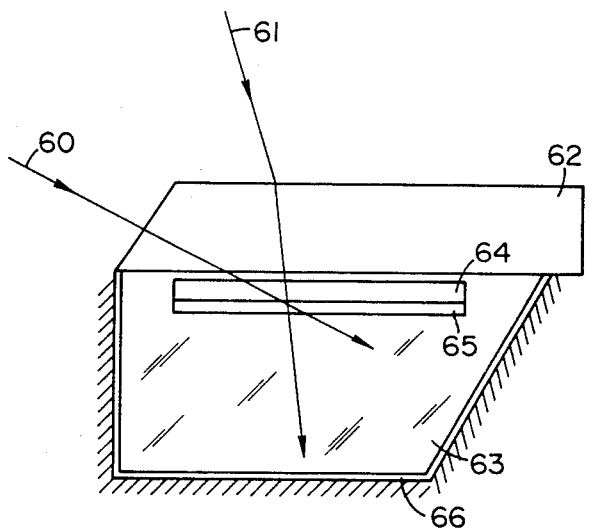
FIG. 11 is the drawing showing the device for preparing diffraction lattice.

The making of the diffraction lattice contained in this invention is attained in the optical system shown in FIG. 11 by utilizing holography technique. Explanation will be given taking the diffraction lattice structure under conditions shown in the first embodiment. The two plane waves 60 and 61 split by the laser ($\lambda = 0.488$ $\mu$m) pass through a prism 62 and index matching oil solution 63 and is incident on photosensitive material layer 65. 64 is a sensitive material base board glass. The incident angles of these two plane waves in the sensitive material are 6.3° and 67.1° respectively. The interference fringe made by these two plane waves is recorded in the sensitive material. This sensitive material is a sensitive material belonging to $\phi VK - CI_4$ family and the refractive index of this sensitive material against $\lambda = 0.488$ $\mu$m light is 1.73. After development, the mean refractive index of this sensitive material against $\lambda = 0.488$ $\mu$m light is reduced to 1.65. In this way the diffraction lattice structure (P=0.279 $\mu$m, $\alpha = 36.7°$) in the first embodiment is obtained. One example of the index matching oil 63 is naphthyl iodide. 66 is a glass frame with a coat of light absorbing paint on the outside. As the sensitive material base board glass 64, a glass element having a refractive index near 1.65 is fitted. In other words, a glass element having a refractive index almost equal to the refractive index of the sensitive material after development is suitable.

By sticking the diffraction lattice structure prepared in this way to a parallel flat plate glass of the same element as the sensitive material base board glass using an adhesive having a refractive index of around 1.65 and further by sticking it to the condenser lens, on which a lower index layer has been vapor deposited, using the similar adhesive, the beam splitting device shown in the first embodiment is made. At this point an adhesive having a low refractive index can be used in place of the lower index layer.

Furthermore, by condensing the beam 60 for making the diffraction lattice shown in FIG. 11 to the neighborhood at the inclined surface of the prism 62 and by making the beam divergent spherical wave or cylindrical wave to let the diffraction lattice have light condensing function, it is possible to give the beam splitting device the light condensing function.

Although a detailed explanation has been given so far to the cases where this beam splitting device is applied to the light metering apparatus system of single lens reflex cameras, this invention is not limited to these cases. Since the beam splitting device based on this invention is not influenced at all by the upper structure of the lower index layer and performs beam splitting function efficiently, other optical system for converting the 0 order diffracted beam (transmitted beam) coming from the diffraction lattice structure in the beam splitting device can be effectively used when it is used in place of the condenser lens.

As have been described so far the beam splitting device according to this invention can be assembled in a light metering apparatus of the camera compactly and effectively. Moreover, the beam splitting device according to this invention can be built in various optical devices compactly not only by coupling with the condenser lens function but also by assembling with other optical elements such as the focusing plate. Furthermore, the beam splitting device according to this invention has advantages such as leading the split light effectively and as being able to utilize the split light efficiently.

What we claim is:

1. An optical device for splitting a light beam incident thereon, comprising:
   a first optical portion constructed to perform at least one optical function;
   a second optical portion in a part of which is provided a diffraction lattice structure for diffracting part of the light beam incident thereon; and
   a lower index layer provided between said first and second optical portions, and having a low refractive index sufficient to totally reflect the diffracted light out of the incident light path;
   wherein said first and second portions and said lower index layer are integrally interconnected.

2. A device according to claim 1, wherein said first optical portion functions to condense light.

3. A device according to claim 1, wherein said lower index layer is a thin film made by the process of vacuum evaporation.

4. A device according to claim 1, wherein said lower index layer is formed by a transparent adhesive which interconnects said first optical portion with said second optical portion.

5. A beam splitting device for the light metering apparatus of a single lens reflex camera, comprising:
   a condenser lens portion having a lens surface and a flat surface;
   a diffraction element portion having a transparent sheet and a diffraction lattice carried by the sheet, said diffraction lattice being arranged to intercept and diffract at least a part of the incident light of predetermined size; and
   a lower index layer provided between said condenser lens portion and said diffraction element portion and having a low refractive index sufficient to totally reflect the diffracted light;
   wherein said condenser lens portion, diffraction element portion and lower index layer are integrally interconnected.

* * * * *

UNITED STATES PATENT OFFICE
CERTIFICATE OF CORRECTION

Patent No. 4,302,075          Dated November 24, 1981

Inventor(s) KAZUYA MATSUMOTO, ET AL.

It is certified that error appears in the above-identified patent and that said Letters Patent are hereby corrected as shown below:

Title page, Item [54], "DEVICE FOR SPLITTING THE LIGHT BEAM INCIDENT" should read --DEVICE FOR SPLITTING THE LIGHT BEAM INCIDENT ON AN OPTICAL SYSTEM--

Title page, in the Abstract, line 8, "interconnect" should read --interconnected--.

Column 1, line 24, "a" should read --an--.

Column 4, line 34, "Accordingly" should read --Accordingly,--.

Signed and Sealed this

Twenty-fifth Day of May 1982

[SEAL]

Attest:

Attesting Officer

GERALD J. MOSSINGHOFF

Commissioner of Patents and Trademarks